(12) United States Patent
Bartelt

(10) Patent No.: US 10,598,131 B2
(45) Date of Patent: Mar. 24, 2020

(54) METHOD AND DEVICE FOR THE OPEN-LOOP OR CLOSED-LOOP CONTROL OF THE AMOUNT OF A FUEL MIXTURE

(71) Applicant: Bayerische Motoren Werke Aktiengesellschaft, Munich (DE)

(72) Inventor: Hans-Christian Bartelt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 126 days.

(21) Appl. No.: 16/040,354

(22) Filed: Jul. 19, 2018

(65) Prior Publication Data
US 2018/0320639 A1 Nov. 8, 2018

Related U.S. Application Data

(63) Continuation of application No. PCT/EP2016/078931, filed on Nov. 28, 2016.

(30) Foreign Application Priority Data

Jan. 20, 2016 (DE) .................. 10 2016 200 751

(51) Int. Cl.
*F02M 25/00* (2006.01)
*F02M 25/022* (2006.01)
(Continued)

(52) U.S. Cl.
CPC ....... *F02M 25/0228* (2013.01); *B01F 5/0413* (2013.01); *F02D 41/3845* (2013.01);
(Continued)

(58) Field of Classification Search
CPC ............ B01F 2215/0088; B01F 5/0413; F02D 41/3845; F02M 25/0221; F02M 25/0225; F02M 25/0228; F23K 5/12; Y02T 10/121
(Continued)

(56) References Cited

U.S. PATENT DOCUMENTS

| 4,430,251 A | 2/1984 | Patterson et al. |
| 4,597,671 A * | 7/1986 | Marelli ..................... F23K 5/12 366/127 |

(Continued)

FOREIGN PATENT DOCUMENTS

| CN | 1287219 A | 3/2001 |
| CN | 102803700 A | 11/2012 |

(Continued)

OTHER PUBLICATIONS

International Search Report (PCT/ISA/210) issued in PCT Application No. PCT/EP2016/078931 dated Feb. 21, 2017 with English translation (six (6) pages).
(Continued)

*Primary Examiner* — George C Jin
*Assistant Examiner* — Teuta B Holbrook
(74) *Attorney, Agent, or Firm* — Crowell & Moring LLP

(57) ABSTRACT

A method and a device for open- or closed-loop control of an amount of water mixed with a fuel is provided. A fuel supply is split into a first branch having a Venturi pipe with a vacuum connection and a second branch having a blocking valve. Water is supplied to the Venturi pipe vacuum connection, and the fuel-water mixture in the first branch and the fuel in the second branch is supplied to the fuel pump. Open-loop or closed-loop control is provided by either reducing fuel flow in the second branch with the stop valve such that the fuel flow in the first branch increases, increasing the amount of water mixed in the fuel at the Venturi pipe, or increasing fuel flow in the second branch such that first branch fuel flow decreases, decreasing the amount of water mixed in the fuel at the Venturi pipe.

9 Claims, 1 Drawing Sheet

(51) Int. Cl.
*B01F 5/04* (2006.01)
*F02D 41/38* (2006.01)
*F23K 5/12* (2006.01)

(52) U.S. Cl.
CPC .... *F02M 25/0221* (2013.01); *F02M 25/0225* (2013.01); *F23K 5/12* (2013.01); *B01F 2215/0088* (2013.01); *Y02T 10/121* (2013.01)

(58) Field of Classification Search
USPC .................................................. 123/25 R, 25 J
See application file for complete search history.

(56) References Cited

U.S. PATENT DOCUMENTS

| | | | |
|---|---|---|---|
| 6,240,883 | B1 | 6/2001 | Ahern et al. |
| 2002/0005177 | A1 | 1/2002 | Harvery |
| 2010/0199939 | A1* | 8/2010 | Cottell .................. F17D 1/17 123/1 A |
| 2011/0273955 | A1* | 11/2011 | Matsumura .......... B01F 3/0807 366/152.1 |
| 2013/0036662 | A1* | 2/2013 | Cottell .................. C10L 1/328 44/639 |
| 2013/0048754 | A1 | 2/2013 | Ortlepp et al. |

FOREIGN PATENT DOCUMENTS

| | | | | |
|---|---|---|---|---|
| DE | 19609800 C1 | 11/1996 | | |
| DE | 10 2010 011915 A1 | 9/2011 | | |
| JP | 2001-12309 A | 1/2001 | | |
| JP | 2015-187407 A | 10/2015 | | |
| RU | 2 418 973 C1 | 5/2011 | | |
| WO | WO-2014030242 A1 * | 2/2014 | ............. | F23D 11/16 |

OTHER PUBLICATIONS

German-language Written Opinion (PCT/ISA/237) issued in PCT/EP2016/078931 dated Feb. 21, 2017 (six (6) pages).

German-language Search Report issued in counterpart German Application No. 10 2016 200 751.3 dated Feb. 8, 2017 with Partial English translation (four (4) pages).

German-language Search Report issued in counterpart German Application No. 10 2016 200 751.3 dated Dec. 29, 2016 with Partial English translation (four (4) pages).

Chinese-language Office Action issued in counterpart Chinese Application No. 201680065622.X dated Oct. 11, 2019 with English translation (12 pages).

* cited by examiner

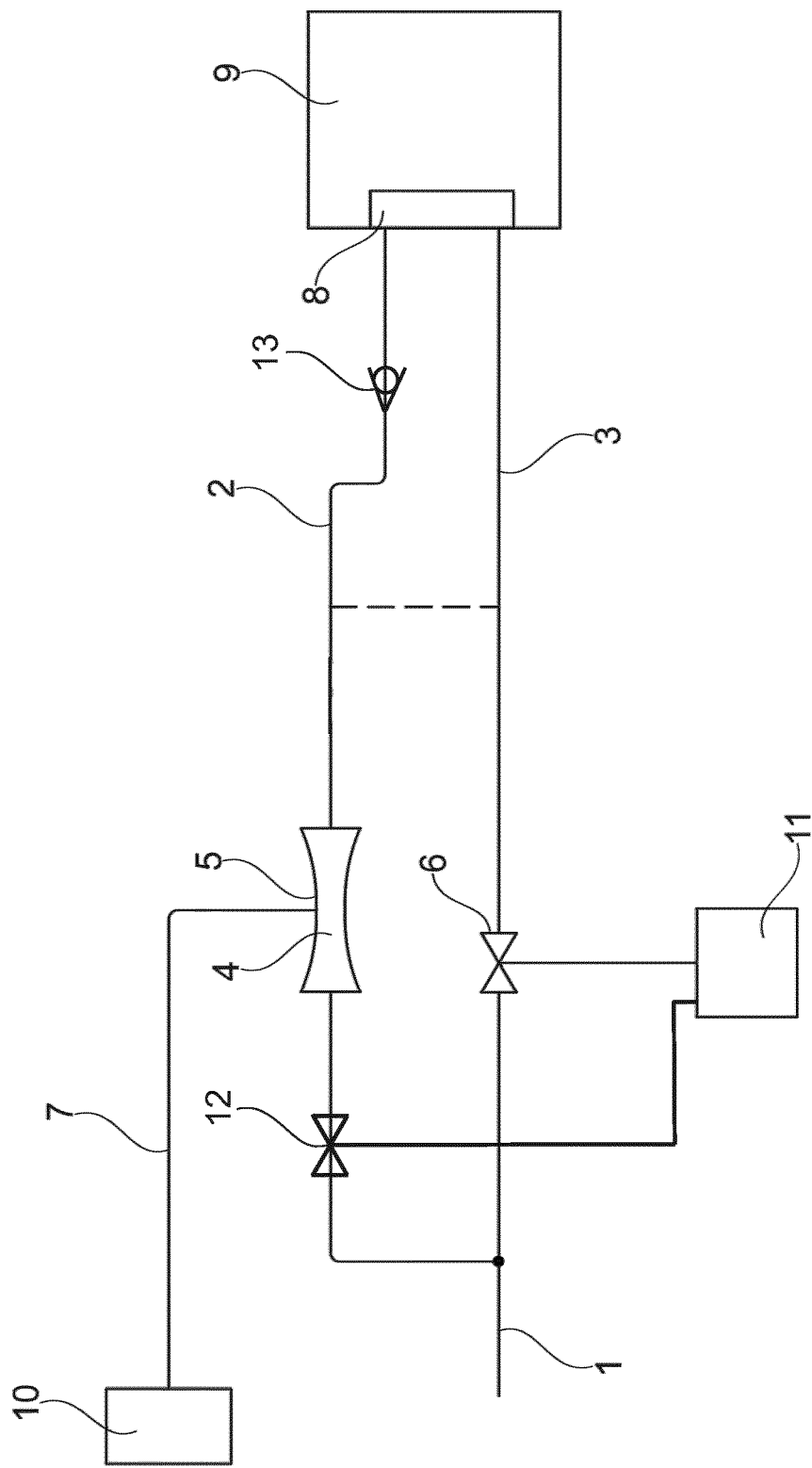

METHOD AND DEVICE FOR THE OPEN-LOOP OR CLOSED-LOOP CONTROL OF THE AMOUNT OF A FUEL MIXTURE

CROSS REFERENCE TO RELATED APPLICATIONS

This application is a continuation of PCT International Application No. PCT/EP2016/078931, filed Nov. 28, 2016, which claims priority under 35 U.S.C. § 119 from German Patent Application No. 10 2016 200 751.3, filed Jan. 20, 2016, the entire disclosures of which are herein expressly incorporated by reference.

BACKGROUND AND SUMMARY OF THE INVENTION

The invention relates to a method for the open-loop or closed-loop control of the amount of water which is added to a fuel before said fuel is supplied to the high-pressure fuel pump of an internal combustion engine, and the invention also comprises a device which is suitable for carrying out said method.

Considerable technical progress is being constantly achieved in the case of internal combustion engines. The consistent increase in the specific power with a simultaneous reduction in fuel consumption and the reduction in the quantity of pollutants ejected are characteristic of this progress. The gasoline engine in particular is currently considered to be one of the most economic and most environmentally compatible thermal engines.

Modern fuel injection systems control the fuel injection time and the fuel injection quantity, for example, by using the data from the air mass flow meter, the charging pressure present and with additional consideration of the exhaust gas temperature and further measurement values. For this purpose, said engine controller electrically actuates one valve per cylinder (individual to the cylinder), namely the injector which replaces the conventional injection nozzles of classic gasoline engines.

The use of water-containing fuels constitutes a possibility in particular of equipping the gasoline engine even for future challenges (for example in respect of stricter exhaust gas legislation) since the injection of water into the fuel is a method which can contribute to achieving the aims of increasing power or reducing consumption and to lower pollutant emission.

The injection of water makes it possible, on the basis of the evaporation enthalpy which is high in comparison to gasoline, to reduce the temperature of the fresh gas prior to the combustion and therefore to shift the knock limit to earlier center of gravity positions and to reduce the full load consumption or raise the compression ratio in order to optimize the partial load consumption.

Since gasoline fuel and water are difficult to mix, there are various methods in the prior art for producing an emulsion for motor vehicle engines. Firstly, there are methods for providing fuel-water emulsions in advance. For this purpose, the water can be mixed with a small quantity of fuel, and the mixture conveyed during operation simultaneously with the main quantity of fuel to the injection nozzle and injected into the combustion chamber. Alternatively, a stable microemulsion can be produced by adding surfactants. Furthermore, an addition of methanol into the fuel may be advantageous.

Secondly, the emulsion may be produced only when required, i.e. on-board in the vehicle, and the application is based on such an "on-board" mixed emulsion. This emulsion has the advantage over the pre-mixed emulsions that the water content of the fuel can be adjusted as needed during the engine operation, and the currently required quantity and composition of the water-fuel emulsion can then be supplied to the high-pressure fuel pump or to the common rail injection system.

The mixing of fuel with water can furthermore also take place directly at the injector since the closer the mixing site is located to the combustion chamber, the smaller is the period of time between emulsion generation and preparation and therefore the "dead time."

For the injection of water, use is made in the prior art of a water pump with which the quantity of water to be added to the fuel can be conveyed as needed.

It is the object of the invention to provide a method which is simple to realize and a simply constructed device for the open-loop or closed-loop control of the amount of water added to the fuel.

The invention achieves the object in a first aspect by a method for the open-loop or closed-loop control of the amount of water which is added to a fuel before said fuel is supplied to the quantity control valve of the high-pressure fuel pump of an internal combustion engine. This method comprises splitting the fuel supply to the high-pressure fuel pump into a first branch with a Venturi tube in the fuel path downstream of the fuel pre-feed pump (electric fuel pump), which has a negative pressure connection, and into a second branch with a stop valve. Water is supplied to the negative pressure connection of the Venturi tube via a water supply line. The amount of water sucked up by the Venturi tube is controlled by open-loop or closed-loop control by the fact that, in order to increase the amount of water in the first branch, the fuel flow in the second branch is reduced by closing the stop valve (which also includes an incomplete closing), and that, in order to reduce the amount of water in the first branch, the fuel flow in the second branch is increased by opening the stop valve (which also includes partial or further opening). The fuel in the second branch and the fuel-water mixture in the first branch are then conveyed to the quantity control valve of the high-pressure fuel pump.

A second aspect of the invention is a device for adding an open-loop-controlled or closed-loop-controlled amount of water into the fuel supply of an internal combustion engine, which comprises a high-pressure fuel pump with a quantity control valve. The device has a fuel supply line which leads to the quantity control valve and divides into a first branch and a second branch. A Venturi tube which has a negative pressure connection is provided in the first branch, and there is an adjustable stop valve in the second branch. Furthermore, a water supply line is provided which is connected to the negative pressure connection of the Venturi tube, and also connections of the first and second branch of the fuel supply line to the quantity control valve of the high-pressure fuel pump.

With the invention, the water pump, which is provided in the prior art, in the fuel supply section is saved. It is replaced by a Venturi tube which does not have any mechanically movable parts, and by a stop valve, for which there are readily suitable and in particular robust embodiments in the prior art. This considerably reduces the complexity of the water injection system.

Further advantages are afforded by embodiments of the claimed method and of the claimed device.

In comparison to a continuous closed-loop control of the stop valve, a keyed closed-loop control at a sufficiently high frequency is particularly simple and robust.

If the water-fuel mixture in the first branch and the fuel in the second branch are guided to the quantity control valve of the high-pressure fuel pump via separate supply lines, the small dead volumes mean that the system is capable of reacting particularly rapidly to changing requirements.

A shut-off valve for the complete (or partial) shutting off of the first branch with the Venturi tube permits a rapid transition between operation with and without injection of water.

The method according to the invention and the device according to the invention are used in particular in the case of gasoline fuel.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 shows an embodiment of the device according to the invention, with which the method according to the invention is carried out.

DETAILED DESCRIPTION OF THE DRAWING

FIG. 1 shows schematically and by way of an excerpt the fuel supply system of a vehicle internal combustion engine, preferably a gasoline engine.

A fuel supply line 1 is connected to a fuel tank (not illustrated here), preferably to a gasoline tank. The fuel supply line 1 is split into two branches, namely a first branch 2 and a second branch 3. In the first branch 2, there is a Venturi tube 4 with a negative pressure connection 5, and in the second branch 3 there is a stop valve 6.

A water supply line 7 is connected to the negative pressure connection 5, via which water supply line highly pure or distilled water is sucked out of a water tank 10 and is mixed in the Venturi tube 4 with the fuel flowing there.

The first and the second branch 2 and 3 can be recombined downstream of the Venturi tube 4, as shown by the interrupted line, or can lead separately to the quantity control valve 8 of a high-pressure pump 9.

The stop valve 6 is activated by a processor 11, which may be part of the engine controller.

A shut-off valve 12 which can shut off the first branch 2 completely or partially, in stages or continuously, and a nonreturn valve 13 which optionally prevents fuel from flowing back into the water inlet region, are situated optionally upstream or downstream of the Venturi tube 4. The nonreturn valve may also be positioned in the water inlet line 7.

The higher the flow rate of the fuel in the first branch 2, the greater is the negative pressure which is produced by the Venturi tube 4 in the water supply line 7, and the greater is therefore also the amount of sucked-up water. This effect is used for the open-loop control or closed-loop control of the supplied amount of water.

The overall amount of fuel flowing into the fuel line 1 is predetermined by the current fuel requirement of the internal combustion engine and should be regarded as a constant for the consideration below. This amount flowing through is divided up in an inverse ratio of the flow resistances in the branches 2 and 3. However, the greater the flow rate through the first branch 2, the greater is also the sucked-up amount of water. Conversely, the amount of sucked-up water is reduced if a greater portion of the fuel flows through the second branch 3.

The stop valve 6 serves for electronically influencing the flow rate ratio and therefore the proportion of water in the fuel. For this purpose, the stop valve 6 can be operated continuously or else in a clocked manner, wherein, in the latter case, the duty ratio determines the flow rate in the second branch 3, and therefore the flow rate in the first branch 2 and hence the amount of water.

If the fuel requirement and therefore the flow rate through the two branches 2 and 3 changes, the setting of the stop valve 6 generally has to be adapted thereto in order to set a proportion of water as needed. This is possible for the processor 11 on the basis of tables and optionally supplemented by measurement values from the process. There are various possibilities for suitable measurement values. One possibility is a direct measurement of the supply of water through the water supply line 7, but also indirect measurements, for example direct measurements at the engine or else engine measurement variables which are already present as standard may be optimum for this purpose.

Finally, the fuel from the second branch 3 and the fuel-water mixture from the first branch 2 are guided to the quantity control valve 8 of the high-pressure fuel pump 9 and therefore to the injection nozzles of the engine. For this purpose, the two branches can first of all be brought together again and, as an overall line, can reach the high-pressure fuel pump 9. Or the quantity control valve 8 has, as in the embodiment which is illustrated in FIG. 1, two connections for the two branches 2 and 3, and only there is there mixing of the liquids guided through the two branches 2, 3.

Water added in the fuel may lead to increased wear—not least because of the increase in power of the engine—and to other disadvantageous effects. In the partial load range of the engine, the production of pollutants may also be so low that further reduction by adding water into the fuel is not required. It is therefore advantageous for the adding of water to be able to be completely suppressed and to take place only if a particularly high engine power is temporarily required, for example during an overtaking operation in a passenger vehicle. Water should also no longer be added if the water tank is virtually empty.

For the complete suppression of the addition of water, the embodiment according to FIG. 1 provides the shut-off valve 12 which completely closes the first branch 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for open-loop or closed-loop control of an amount of water added to a fuel before the fuel is supplied to a high-pressure fuel pump of an internal combustion engine, comprising the acts of:
splitting a supply of the fuel to the high-pressure fuel pump into a first branch having a Venturi tube with a negative pressure connection, and into a second branch with a stop valve;
supplying water to the negative pressure connection of the Venturi tube via a water supply line;
controlling, by open-loop or closed-loop control, the amount of water drawn into the Venturi tube by either reducing a fuel flow in the second branch by reducing an amount of opening of the stop valve such that an increase in a fuel flow in the first branch increases the amount of water drawn into the Venturi tube to form a fuel-water mixture, or increasing the fuel flow in the second branch by increasing the amount of opening of the stop valve such that a decrease of the amount of the fuel flow in the first branch decreases the amount of water drawn into the Venturi tube to form the fuel-water mixture; and supplying the fuel-water mixture in the first branch and the fuel in the second branch to a quantity control valve of the high-pressure fuel pump.

2. The method as claimed in claim 1, wherein the stop valve is configured to reduce the fuel flow rate in the second branch in a continuous manner.

3. The method as claimed in claim 1, wherein the throttle valve is configured to reduce the fuel flow rate in the second branch in a clocked manner.

4. The method as claimed in claim 1, wherein the water-fuel mixture in the first branch is combined with the fuel in the second branch downstream of the stop valve and upstream of the quantity control valve.

5. The method as claimed in claim 1, wherein the water-fuel mixture of the first branch and the fuel of the second branch are guided via separate supply lines to the high-pressure fuel pump.

6. The method as claimed in claim 1, wherein the water is distilled water from a water tank.

7. The method as claimed in claim 1, wherein the amount of water drawn into the Venturi tube is controlled by open-loop or closed-loop control by a processor controlling opening or closing the stop valve on the basis of process data received by the processor from the vehicle.

8. A device for adding an open-loop-controlled or closed-loop-controlled amount of water into the fuel supply of an internal combustion engine, comprising:

a high-pressure fuel pump a fuel supply line leading to the high-pressure fuel pump or to a quantity control valve of the high pressure fuel pump, the fuel supply line having a first branch and a second branch;

a Venturi tube having a negative pressure connection in the first branch;

an adjustable stop valve in the second branch; and a water supply line connected to the negative pressure connection of the Venturi tube.

9. The device as claimed in claim 8, further comprising:

a shut-off valve in the first branch upstream of the Venturi tube.

* * * * *